(12) United States Patent
Sunkara et al.

(10) Patent No.: US 12,198,681 B1
(45) Date of Patent: Jan. 14, 2025

(54) PERSONALIZED BATCH AND STREAMING SPEECH-TO-TEXT TRANSCRIPTION OF AUDIO

(71) Applicant: Amazon Technologies, Inc., Seattle, WA (US)

(72) Inventors: Monica Lakshmi Sunkara, San Jose, CA (US); Srikanth Ronanki, San Jose, CA (US); Sravan Babu Bodapati, Redmond, WA (US); Jeffrey John Farris, Crystal Lake, IL (US); Katrin Kirchhoff, Seattle, WA (US); Vivek Govindan, Redmond, WA (US); Yide Zou, Aachen (DE); Mohit Narendra Gupta, Seattle, WA (US); Silviu Mihai Burz, Sinking Spring, PA (US)

(73) Assignee: Amazon Technologies, Inc., Seattle, WA (US)

( * ) Notice: Subject to any disclaimer, the term of this patent is extended or adjusted under 35 U.S.C. 154(b) by 183 days.

(21) Appl. No.: 17/937,297

(22) Filed: Sep. 30, 2022

(51) Int. Cl.
*G10L 15/16* (2006.01)
*G10L 15/30* (2013.01)
*G10L 25/51* (2013.01)

(52) U.S. Cl.
CPC .............. *G10L 15/16* (2013.01); *G10L 15/30* (2013.01); *G10L 25/51* (2013.01)

(58) Field of Classification Search
CPC .......... G10L 15/16; G10L 15/30; G10L 25/51
See application file for complete search history.

(56) References Cited

U.S. PATENT DOCUMENTS

2019/0189111 A1* 6/2019 Watanabe ............... G10L 15/16
2020/0242197 A1* 7/2020 Srinivasan ............... G06N 3/08

OTHER PUBLICATIONS

Gulati et al., "Conformer: Convolution-augmented Transformer for Speech Recognition", Electrical Engineering and Systems Science, May 16, 2020, 5 pages.

(Continued)

*Primary Examiner* — Ibrahim Siddo
(74) *Attorney, Agent, or Firm* — Nicholson DeVos Webster & Elliott LLP

(57) ABSTRACT

Techniques for personalized batch and streaming speech-to-text transcription of audio reduce the error rate of automatic speech recognition (ASR) systems in transcribing rare and out-of-vocabulary words. The techniques achieve personalization of connectionist temporal classification (CT) models by using adaptive boosting to perform biasing at the level of sub-words. In addition to boosting, the techniques encompass a phone alignment network to bias sub-word predictions towards rare long-tail words and out-of-vocabulary words. A technical benefit of the techniques is that the accuracy of speech-to-text transcription of rare and out-of-vocabulary words in a custom vocabulary by automatic speech recognition (ASR) system can be improved without having to train the ASR system on the custom vocabulary. Instead, the techniques allow the same ASR system trained on a base vocabulary to realize the accuracy improvements for different custom vocabularies spanning different domains.

20 Claims, 9 Drawing Sheets

(56) References Cited

OTHER PUBLICATIONS

Heafield et al., "Scalable Modified Kneser-Ney Language Model Estimation", Proceedings of the 51st Annual Meeting of the Association for Computational Linguistics, Aug. 4-9, 2013, pp. 690-696.
Kim et al., "Joint CTC-attention based end-to-end speech recognition using multi-task learning", IEEE International Conference on Acoustics, Speech and Signal Processing (ICASSP), Jan. 31, 2017, 5 pages.
Le et al., "Deep Shallow Fusion for RNN-T Personalization", IEEE Spoken Language Technology Workshop (SLT), Nov. 16, 2021, 7 pages.
Le et al., "G2G: TTS-Driven Pronunciation Learning for Graphemic Hybrid ASR", IEEE International Conference on Acoustics, Speech and Signal Processing (ICASSP), Feb. 13, 2020, 5 pages.
Liptchinsky et al., "Letter-Based Speech Recognition with Gated ConvNets", Computer Science, Feb. 16, 2019, 10 pages.
Saxon et al., "End-to-End Spoken Language Understanding for Generalized Voice Assistants", Computer Science, Jul. 19, 2021, 5 pages.
Wu et al., "Google's Neural Machine Translation System: Bridging the Gap between Human and Machine Translation", Computer Science, Oct. 8, 2016, pp. 1-23.
Zhao et al., "On Addressing Practical Challenges for RNN-Transducer", IEEE Automatic Speech Recognition and Understanding Workshop (ASRU), Jul. 18, 2021, 8 pages.

\* cited by examiner

Types of errors in CTC decoding with examples

| Error Type | Reference | Hypothesis |
|---|---|---|
| Sub | _po p s o ck et | _po p s _ up ck et |
| Del | _k a z a k h s t an | _z a k |
| Ins | _put in | _put t in |
| Sub+Del | _r h e um at o id | _re id |
| Sub+Del+Ins | _y op la it | _your _p l ate |

FIG. 4

Algorithm 1 Modified CTC Greedy decoding with personalization

1: Input: $X$ : intput speech, $Custom\_dict$ : sub-word prefix graph of custom words
2: $hyp = []$
3: $C = $ CTC_Predict(Conformer_Encoder($X$))
4: for t=1 to T do
5:    $y^*_{idx} = argmax(C[t])$
6:    $y^* = idx\_to\_label(y^*_{idx})$
7:    $y_{top\_k}$ = top-k alternate subwords and their scores in output
8:    $s_{top\_k}$ = scores of top-k
9:    $s_{boost} = 0$
10:    if $y^* == blank$ then
11:      $s_{boost} = s_{del}$
12:    else if $y^*$ is not a valid prefix in $Custom\_dict$ : then
13:      $s_{boost} = s_{sub}$
14:    end if
15:    for i=1 to k do
16:      $(l_i, s_i) = y_{top\_k}[i]$
17:      if $s_i == blank$ then
18:        $s_{top\_k}[i]\ +=\ s_{ins}$
19:      end if
20:      if prefix sequence so far $\in Custom\_dict$ then
21:        get next_valid_subword_list from $Custom\_dict$ using prefix sequence so far
22:        if $s_i \in$ next_valid_subword_list then
23:          $s_{top\_k}[i]\ +=\ s_{boost}$
24:        end if
25:      end if
26:    end for
27:    $y^*_{boosted}$ = top subword after boosting
28:    Append $y^*_{boosted}$ to $hyp$
29: end for
30: Output: remove repeated tokens in $hyp$ and convert into words

*FIG. 5*

Example utterances from proposed model outputs

Baseline: thats on yahoo is their longest running prime minister is jus
Proposed Model: netanyahu is their longest running prime minister is jerusalem

Baseline: you will see that because stone is massive i am sure that puttin wants it back
Proposed Model: you will see that kazakhstan is massive i am sure that putin wants it back Baseline: most politicians could not find as i be on on a map to be honest
Proposed Model: most politicians could not find azerbaijan on a map to be honest Baseline: ten years since the focusing and disaster
Proposed Model: ten years since the fukushima disaster Baseline: maxals is sold as a mouth spray
Proposed Model: nabiximols is sold as a mouth spray

*FIG. 6*

PERSONALIZED BATCH AND STREAMING SPEECH-TO-TEXT TRANSCRIPTION OF AUDIO

TECHNICAL FIELD

The present disclosure relates generally to automatic or automated speech recognition, abbreviated herein as "ASR." Specifically, the present disclosure relates to methods, apparatuses, systems, and non-transitory computer-readable media (generally "techniques") for personalized batch and streaming speech-to-text transcription of audio.

BACKGROUND

A transformer is a deep feed-forward artificial neural network with a self-attention mechanism. Transformers are often used to model sequential data. Transformer-based end-to-end speech recognition models trained using joint Connectionist Temporal Classification (CTC)-attention loss have been used for speech recognition tasks. CTC loss calculates a loss between a continuous time series and a target sequence by summing over the probability of possible alignments of input to target to produce a loss value that is differentiable with respect to each input node. For speech recognition tasks, outputs from a CTC decoder can be used at inference time due to the speed and simplicity of the decoder.

In addition to a transformer-based end-to-end speech recognition loss trained using joint CTC-Attention loss, a N-gram language model or a neural language model trained on text data can be used with a beam search decoder to improve contextualization and domain adaptation. Language modeling can encompass the use of statistical and probabilistic techniques (e.g., N-gram, unigram, bidirectional, exponential, or continuous space) to determine the probability of a given word in a sequence of words such as a sentence.

Despite the beneficial combination of transformer-based end-to-end speech recognition models trained using joint CTC-attention loss and language models, it can still be difficult to effectively personalize CTC models toward a domain-specific vocabulary. Thus, speech recognition techniques that improve word error rate or accuracy for personalized CTC models would be appreciated. The present disclosure provides a solution to this and other issues.

BRIEF DESCRIPTION OF DRAWINGS

Various examples in accordance with the present disclosure will be described with reference to the drawings, in which:

FIG. 4 illustrates examples of types of errors in greedy decoding, according to some examples.

FIG. 5 illustrates pseudo-code of a modified CTC greedy decoding with personalization algorithm, according to some examples.

FIG. 6 illustrates example utterances from proposed model outputs, according to some examples.

Figure 1:
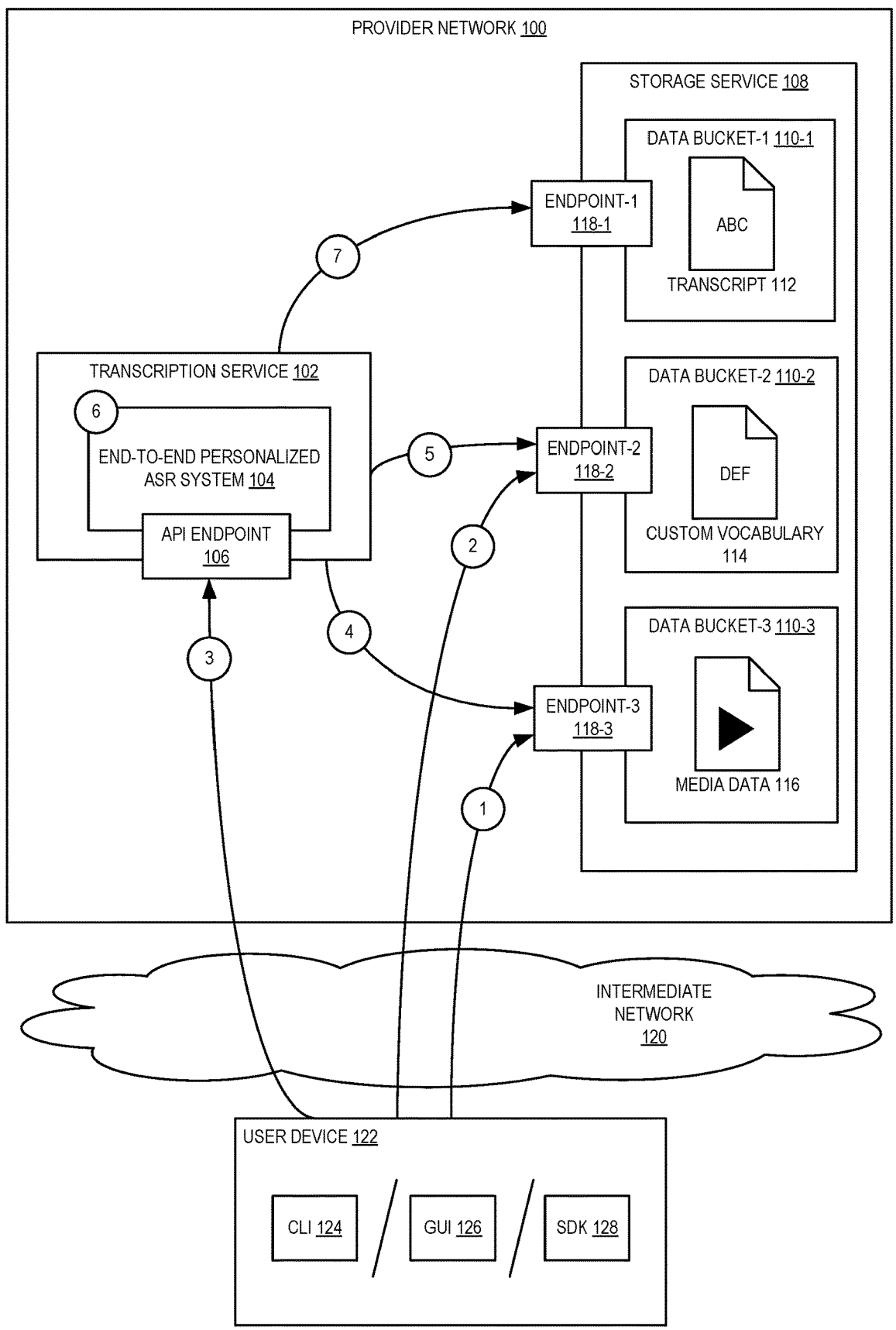
FIG. 1 illustrates a provider network environment in which the techniques for personalized batch speech-to-text transcription of audio can be implemented, according to some examples.

It will be appreciated that for simplicity or clarity of illustration, elements illustrated in the figures have not necessarily been drawn to scale. For example, the dimensions of an element may be exaggerated relative to another element for clarity. Further, if considered appropriate, reference numerals have been repeated among the figures to indicate corresponding or analogous elements.

DETAILED DESCRIPTION

The present disclosure relates to methods, apparatuses, systems, and non-transitory computer-readable media (generally "techniques") for personalized batch and streaming speech-to-text transcription of audio. In some examples, the techniques achieve personalization of CTC models by using adaptive boosting to perform biasing at the level of sub-words. In addition to boosting, the techniques encompass a phone alignment network to bias sub-word predictions towards rare long-tail words and out-of-vocabulary words. The combination of adaptive boosting and the phone alignment network has achieved a greater than ten percent word error rate reduction and a greater than seventy percent relative F1 score improvement compared to a strong beam search decoding baseline.

In some examples, a technical benefit of the techniques is that the accuracy of speech-to-text transcription of rare and out-of-vocabulary words in a custom vocabulary by an automatic speech recognition (ASR) system can be improved without having to train the ASR system on the custom vocabulary. Instead, the techniques allow the same ASR system trained on a base vocabulary to realize the accuracy improvements for different custom vocabularies spanning different domains.

End-to-end machine learning techniques encompass training a complex machine learning system by applying gradient-based learning to the system as a whole. End-to-end techniques such as CTC, transducer, and sequence-to-sequence models with attention have been used for training large vocabulary speech recognition applications. Such end-to-end systems have achieved results on par with or better than other ASR systems that make use of independent acoustic, pronunciation, and language models.

Joint optimization can provide even more efficacy. For example, a transducer model can perform better when the encoder is initialized with either CRC or cross entropy (CE) trained weights. Likewise, a joint CTC-Attention framework can utilize the benefits of both CTC and attention during training.

More recently, conformer for speech recognition has been proposed that combines transformer and convolution modules into so-called "conformer" blocks. Conformer blocks in combination with CTC-attention has been used to train end-to-end speech recognition models. Building on this, a unified solution where CTC-attention with a shared transformer or conformer encoder has been adopted. In the second pass, an attention decoder is used to rescore CTC hypotheses. While two-pass decoding can yield good results, it can in-turn increase the real time factor (RTF) or latency of streaming models. Thus, single-pass CTC inference may still be preferred where minimizing or reducing speed and memory footprint are important.

Unfortunately, a limitation of CTC inference can be a conditional independence assumption that the output prediction at time t is independent of other outputs for a given input. This assumption can present a challenge to tuning CTC models for personalization. Transducer-focused solutions for personalization and contextual biasing have been used. Some of these solutions induce better coverage of rare sub-words during training leveraging grapheme-to-grapheme (G2G) to produce additional pronunciation variants in both training and decoding, along with biasing with Deep Fusion. G2G is a technique for training a statistical grapheme-to-grapheme (G2G) model on text-to-speech data that can rewrite an arbitrary character sequence into more phonetically consistent forms. More information on G2G can be found in the following paper by D. Le, T. Koehler, C. Fuegen, and M. K. Seltzer; "G2G: TTS-driven pronunciation learning for graphemic hybrid ASR," in Proc. ICASSP, 2020, pp. 6869-6873, the entire contents of which is hereby incorporated by reference as if fully set forth herein. Deep Fusion is a technique for improving the ability of a Recurrent Neural Network Transducer (RNN-T) to model rare sub-words, infuse extra information into the encoder, enable the use of alternative graphemic pronunciations, and perform deep fusion with personalized language models for more robust biasing. More information on Deep Fusion is available in the paper by D. Le, G. Keren, J. Chan, J. Mahadeokar, C. Fuegen, and M. L. Seltzer; "Deep Shallow Fusion for RNN-T Personalization," in IEEE Spoken Language Technology Workshop (SLT), 2021, pp. 215-257, the entire contents of which is hereby incorporated by reference as if fully set forth herein.

While some of these approaches can improve recognition of rare and out-of-vocabulary words, accurate recognition of such words still confounds CTC models. There are two main reasons for this confoundment. First, CTC models cannot influence future predictions based on previous output tokens. As a result, post-processing is typically used to bias the output predictions toward rare and out-of-vocabulary words. Second, the outputs of CTC models include blanks and duplicate tokens. This complicates post-processing biasing. Relatedly, the outputs of CTC models are typically graphemes or sub-words having sequences that to do not directly correspond to how they are pronounced.

To address the foregoing issues and other issues, techniques for personalizing CTC models are disclosed that improve the overall recognition of rare and out-of-vocabulary words. The techniques encompass improvements with sub-word boosting over greedy CTC decoding for uses cases where inference speed is important. The techniques encompass on-the-fly dynamic adaptive boosting of sub-words in combination with a prefix beam search decoder to improve recognition of rare and unconventional words. To address the issue of misrecognition of words having pronunciations that do not match a corresponding sub-word sequence, the techniques use a phone alignment network. In addition, sub-word predictions are biased at inference time by utilizing phoneme and sub-word level output predictions. The techniques also encompass use of G2G to generate additional pronunciation variants to address unseen decomposition of rare words during training.

Provider Network Environment

Figure 2:
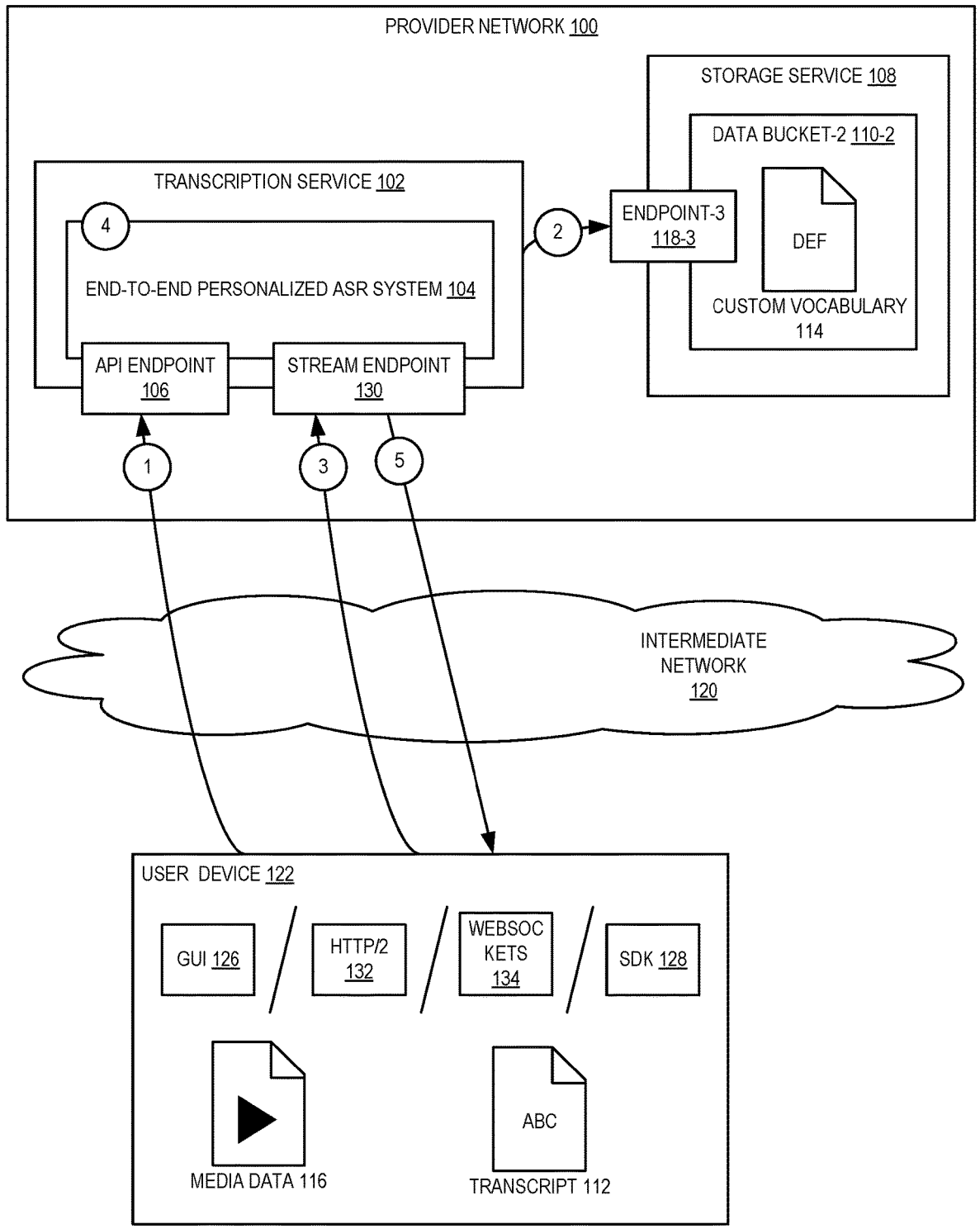
FIG. 2 illustrates a provider network environment in which the techniques for personalized streaming speech-to-text transcription of audio can be implemented, according to some examples.

FIG. 1 illustrates a provider network environment in which personalized batch speech-to-text transcription of audio is performed, according to some examples. FIG. 2 illustrates the provider network in which personalized streaming speech-to-text transcription of audio is performed, according to some examples. The provider network environment may be capable of simultaneously supporting both batch speech-to-text transcription (e.g., as illustrated in FIG. 1) and streaming speech-to-text transcription (e.g., as illustrated in FIG. 2). In particular, end-to-end personalized automatic speech recognition (ASR) system 104 can be used for both batch and streaming speech-to-text transcription. Detailed operation of personalized ASR system 104 according to some examples is described in greater detail elsewhere herein including, for example, with respect to FIG. 7.

Techniques for personalized batch and streaming speech-to-text transcription of audio can be performed in the context of provider network 100. Provider network 100 can be programmed or configured to adhere to a "cloud" computing model that enables ubiquitous, convenient, on-demand network access to a shared pool of configurable resources such as networks, servers, storage applications, and services. The resources can be rapidly provisioned and released with minimal management effort or service provider interaction. A user of provider network 100 (sometimes referred to herein as a "customer") can unilaterally provision computing capabilities in provider network 100, such as server time and network storage, as needed automatically without requiring human interaction with the service provider.

Capabilities of provider network 100 can be available over intermediate network 120 (e.g., the Internet) and accessed through standard mechanisms that promote use by heterogeneous thin or thick client platforms such as mobile phones, tablets, laptops, and workstations. Computing resources such as storage, processing, memory, and network bandwidth in provider network 100 can be pooled to serve multiple customers using a multi-tenant model, with different physical and virtual resources dynamically assigned and reassigned according to customer demand. There can be a sense of location independence in that the customer generally can have no control or knowledge over the exact location of provided resources but can be able to specify location at a higher level of abstraction such as, for example, at the level of a country, state, or datacenter.

Provider network 100 can automatically control and optimize resource use by leveraging a metering capability (e.g., on a pay-per-use or on a charge-per-use basis) at a level of abstraction appropriate to the type of service such as storage, processing, bandwidth, and active customer accounts. Resource usage in provider network 100 can be monitored, controlled, and reported, providing transparency for both the provider and the customer of a utilized service.

Provider network 100 can provide its capabilities to customers according to a variety of different service models including Software-as-a-Service ("SaaS"), Platform-as-a-Service ("PaaS"), and Infrastructure-as-a-Service ("IaaS").

With SaaS, a capability can be provided to a customer using the provider's software applications running on the infrastructure of provider network 100. The applications can be accessible from various client devices through either a thin client interface such as a web browser, or an Application Programming Interface (API). The infrastructure can include the hardware resources such as server, storage, and network components and software deployed on the hardware infrastructure that are necessary to support the services being provided. Typically, under the SaaS model, the customer does not manage or control the underlying infrastructure including network, servers, operating systems, storage, or individual application capabilities, except for limited customer-specific application configuration settings.

With PaaS, the customer can be provided the capability to deploy onto hardware and software infrastructure of provider network 100 customer-created or acquired applications using programming languages, libraries, services, and tools supported by the provider or other sources. Typically, under the PaaS model, the customer does not manage or control the underlying hardware and software infrastructure including network, servers, operating systems, or storage, but can have control over the deployed applications and possibly configuration settings for the application-hosting environment.

With IaaS, the customer can be provided the capability to provision processing, storage, networks, and other fundamental computing resources where the customer can deploy and run arbitrary software, which can include operating systems and applications. The customer typically does not manage or control the underlying hardware and software infrastructure but can have control over operating systems, storage, and deployed applications and possibly limited control of selecting network components such as, for example, host firewalls.

Provider network 100 can provide its capabilities to a customer according to a variety of different deployment models including as a private cloud, as a community cloud, as a public cloud, or as a hybrid cloud.

In a private cloud, the hardware and software infrastructure of provider network 100 can be provisioned for exclusive use by a single organization which can comprise multiple customers. The private cloud can be owned, managed, and operated by the organization, a third party, or some combination of them, and it can exist on or off premises.

In a community cloud, the hardware and software infrastructure of provider network 100 can be provisioned for exclusive use by a specific community of customers from organizations that have shared concerns such as mission security requirements, policy, and compliance considerations. The community cloud can be owned, managed, and operated by one or more of the organizations in the community, a third party, or some combination of them, and it can exist on or off premises.

In a public cloud, the infrastructure can be provisioned for open use by the public. The public cloud can be owned, managed, and operated by a business, academic, or government organization, or some combination of them. A public cloud can exist on the premises of the public cloud provider.

In a hybrid cloud, the infrastructure can be a composition of two or more distinct cloud infrastructures (private, community, or public) that remain unique entities, but that can be bound together by standardized or proprietary technology that enables data and application portability such as, for example, cloud bursting for load balancing between clouds.

Starting first with a discussion of batch speech-to-text transcription, steps of a method for batch speech-to-text transcription using personalized ASR model 104 are depicted in FIG. 1 by numbered circles. While the steps of the method (and the method of FIG. 2) can be performed in the order of the numbers in the circles, performance is the method is not necessarily strictly limited to that order. Some steps can be performed in a different order than depicted. For example, step "2" can be performed before step "1". Further, some steps can be performed concurrently, simultaneously, or be parallelized. For example, steps "1" and "2" can be performed concurrently or simultaneously. More generally, the order of the steps depicted is merely one example order and the steps can be performed in different orders according to the requirements of the particular implementation at hand to achieve substantially the same result. The directed arrows represent a direction of data flow between components but not necessarily the exclusive direction.

At step "1", media data 116 is uploaded from user device 122 to provider network 100 for storage in data bucket-3 110-3 of storage device 108. An interface such as command line interface 124, graphical user interface 126, or software development kit (SDK) 128 can be used to upload media data 116 from user device 122. User device 122 can be an electronic device having hardware components such as those depicted and described below with respect to FIG. 9. In some examples, user device 122 is a personal computing device (PC), a smart phone, a tablet computer, a virtual assistant device (e.g., a SIRI, CORTANA, GOOGLE ASSISTANT, or ALEXA virtual assistant device), or other type of electronic device with computing and networking capabilities.

In some examples, media data 116 comprises audio data encoding one or more channels of the spoken utterances of one or more speakers in one or more spoken languages. For batch speech-to-text transcription, the audio data can be encoded is one of a variety of different media formats such as, for example, .AMR, .FLAC, .MPS, .MP4, .OGG, .WEBM, or .WAV. The audio data can represent spoken utterances spanning a duration, for example, a short as 500 milliseconds and up to 4 hours of spoken utterances.

In some examples, media data 116 is uploaded to and associated with endpoint-3 118-3 of storage service 108. Endpoint-3 118-3 can be a Uniform Resource Indicator (URI) or the like (e.g., a URL) at which media data 116 is accessible at storage service 108.

In some examples, media data 116 comprises only audio data. However, media data 116 can include other types of media data such as, for example, video data.

At step "2", custom vocabulary 114 is uploaded from user device 122 to provider network 100 for storage in data bucket-2 110-2 of storage device 108. An interface such as command line interface 124, graphical user interface 126, or software development kit (SDK) 128 can be used to upload custom vocabulary 114 from user device 122. While custom vocabulary 114 can be uploaded to a different data bucket of storage service 108 than the data bucket to which media data 116 is uploaded, custom vocabulary 114 can be uploaded to (stored in) the same data bucket as media data 116.

In some examples, custom vocabulary 114 is used by personalized ASR system 104 to improve transcription accuracy for one or more custom words. The custom words can include domain-specific terms such as brand names and acronyms, proper nouns, or other rare or out-of-vocabulary words. A custom word can be a compound word composed of multiple root words (e.g., "Los Angeles" or "Eva Maria"). In some examples, custom vocabulary 114 contains a set (list) of custom words (e.g., as comma-separated or line-separated words). In some examples, custom vocabulary 114 contains a table of custom words. The table format can contain a row per custom word. One of the columns contains the set of custom words. And one or more other columns contain data representing various attributes of the custom word. In some examples, a "sounds-like" column contains hyphen-separated syllables that mimic how custom words sound. For example, the sounds-like column may contain the hyphen-separated syllables "loss-ann-gel-es" for the customer word "los angeles." In some examples, an "International Phonetic Alphabet (IPA) column" contains phonetic spellings of custom words using only characters in the IPA. For example, the phonetic spelling for "los angeles" can be "l ɔ s æ n dʒ ə l ə s."

In some examples, a custom word in custom vocabulary 114 is designated to be specially boosted during the speech-to-text transcription process performed by ASR system 104. A user might notice that transcripts generated by transcription service consistently or regularly err in translating a domain-specific/jargon word as a more common word (e.g., because the domain-specific/jargon word and the more common words are heterographs). To address this, the domain-specific/jargon word can be included in custom vocabulary 114 with a special boost designation. For example, in the table format of custom vocabulary 114, a column can be used to indicate custom words that are to be specially boosted. In some examples, the special boost designation is a binary option where no special boosting is the default option, and the other option is to specially boost the word. Alternatively, no special boosting can still be the default option. However, the special boost designation for a specially boosted word in custom vocabulary 114 can indicate a magnitude of the special boost. For example, the magnitude can be indicated on a scale of discrete values (e.g., a quantitative scale of 1 to 3, 1 to 5, or 1 to 10 or a qualitative scale such as low, medium, and high).

At step "3", a start transcription job command/request is used from user 122 using CLI 124, GUI 126, or SDK 128. The command/request is sent over intermediate network 120 and received at API endpoint 106 of transcription service 102. The command can specify endpoint-3 118-3 of media data 116, endpoint-2 118-2 of custom vocabulary 114 and endpoint-1 118-1 of transcript 112 to be generated and stored in storage service 108.

At step "4", transcription service 102 uses endpoint-3 118-3 specified in the start transcription job command/request to fetch (download) media data 116 from storage service 108.

At step "5", transcription service 102 uses endpoint-2 118-2 specified in the start transcription job command/request to fetch (download) custom vocabulary 114 from storage service 108.

At step "6", personalized ASR model 104 of transcription service 102 uses media data 116 and custom vocabulary 114 to generate text transcript 112 of the spoken utterances encoded in the audio data of media data 116.

At step "7", transcription service 102 puts (uploads) the generated transcript 112 to data bucket-1 110-1 of storage service 108 using endpoint-1 118-1 specified in the start transcription job command/request. While transcript 112 can be stored in a different data bucket of storage service 108 than the data bucket that stores custom vocabulary 114 or media data 116, transcript 112 can be stored in the same data bucket as custom vocabulary 114 or media data 116.

Transcript 112 can be generated in a machine and human readable data form such as JavaScript Object Notation (JSON), extensible Markup Language (XML), of the like. A part of transcript 112 can contain the transcription itself. In some examples, the transcription is in paragraph form. In some examples, transcript 112 can also include additional data for every word and punctuation mark in the transcription. For example, transcript 112 can contain a start timestamp, an end timestamp, and a confidence word for every transcribed word.

Moving next to a discussion of streaming speech-to-text transcription, steps of a method for streaming speech-to-text transcription using personalized ASR model 104 are depicted in FIG. 2 by numbered circles and directed arrows. Before the method commences, custom vocabulary 114 has been uploaded to data bucket-2 110-2 of storage service 108 and accessible from storage service 108 at endpoint-3 118-3.

At step "1", GUI 126 or SDK 128 is used to send a start streaming transcription job command/request from user device 122. The command/request is transmitted from user device 122 via intermediate network 120 and received at API endpoint 106 of transcription service 102. The command/request can specify endpoint-3 118-3 of custom vocabulary 114. The command/request can also specify the type of streaming transcription session that transcription service 102 should establish with user device 112. One type of streaming session is HTTP/2 132. Another type of streaming session is WebSockets 134.

At step "2", transcription service 102 uses endpoint-3 118-3 specified in the command/request to get (download) custom vocabulary 114 from storage service 108.

At step "3", user device 122 begins stream media data 116 from user device 112 to stream endpoint 130 via intermediate network 120 using HTTP/2 132 or WebSockets 134. In some examples, media data 116 containing audio data is streamed in an audio format such as FLAC, OPUS, or PCM.

At step "4", as media data 116 is received from user device 122, personalized ASR system 104 uses the streamed media data 116 and custom vocabulary 114 to generate transcript 112.

At step "5, as transcript 112 is generated by personalized ASR system 104, transcript 112 is streamed back to user device 112.

Because streaming speech-to-text transcription can operate in real time, transcript 112 can be partially produced. Transcription service 102 can break up the stream of media data 116 based on natural speech segments, such as a change in speaker or a pause in the audio. Transcript 112 can be streamed back to user device 112 as a stream of transcription events. Each transcription event can contain more transcribed speech until an entire segment is transcribed. For example, as a user at user device 122 speaks a sentence into a microphone, media data 116 containing audio encoding spoken words of the sentence can be streamed at step "3" to transcription service 102 for transcription at step "4". Partial transcription of the sentence can be streamed back to user device 112 at step "5". For example, if the spoken sentence is the "The quick box fox," then a first transcription event streamed to user device 122 at a first time might contain the transcription "The", a subsequent transcription event streamed to user device 122 at a second time might contain the transcription "The quick," a further transcription event streamed to user device 122 might contain the transcription "The quick brown," and a final transcription event streamed to user device 122 for the spoken sentence might contain the transcription "The quick brown fox." to complete the transcription of utterance.

Conformer CTC-Attention Framework

Figure 3:
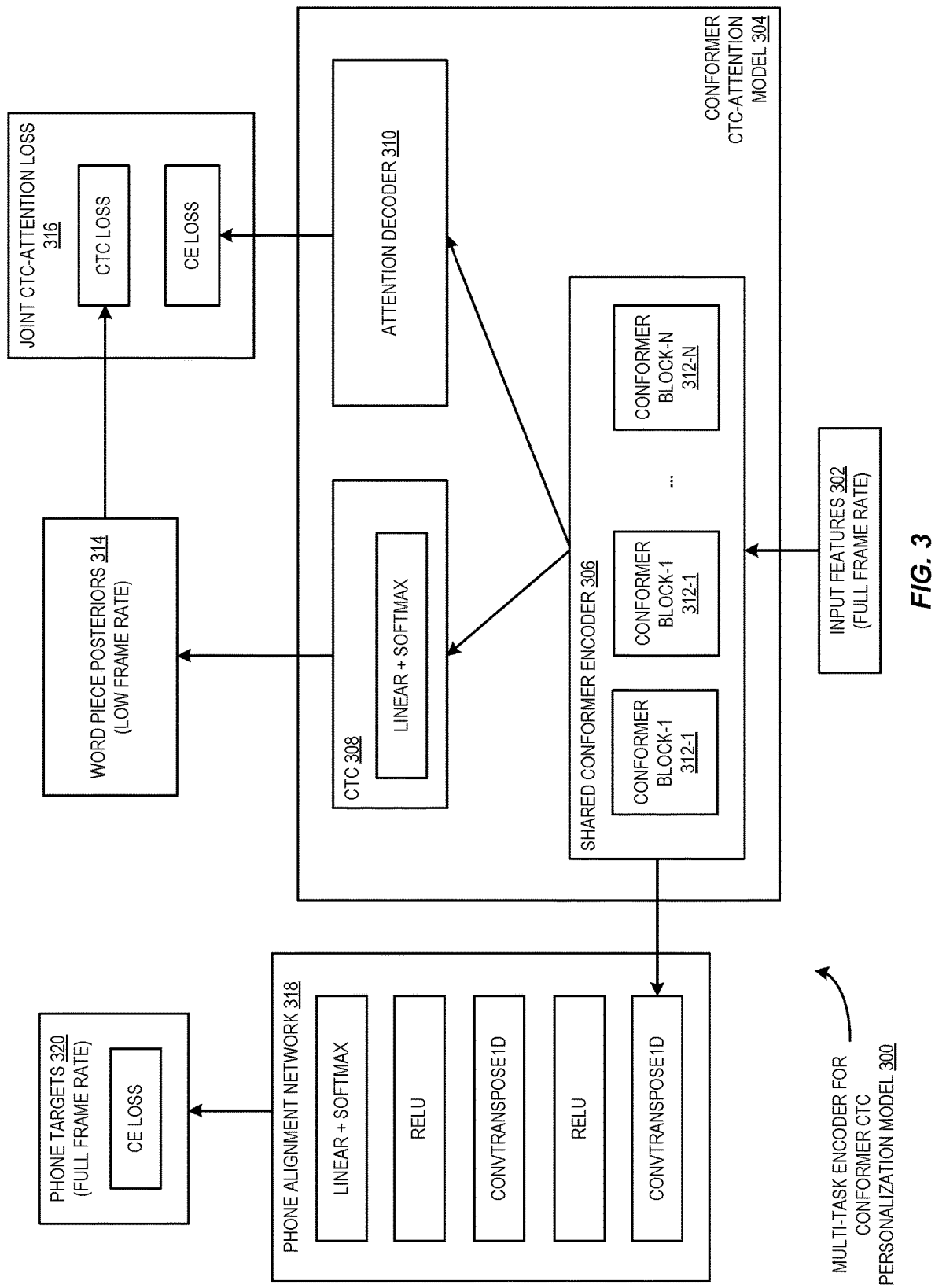
FIG. 3 illustrates a multi-task encoder for conformer CTC personalization model, according to some examples.

According to some examples, end-to-end personalized ASR system 104 includes a multi-task encoder for conformer CTC personalization model in an inference configuration (e.g., a configuration for generating inferences for given input). FIG. 3 illustrates multi-task encoder for conformer CTC personalization model 300 in a training configuration, according to some examples. The training configuration can be used to train model 300 to generate inferences. In some examples, the inference configuration omits some of the components of the training configuration that are used to train model 300 but that are not needed to generate inferences once model 300 is trained. For example, model 300 in the inference configuration may exclude attention decoder 310.

Model 300 includes conformer CTC attention model 304 that is based on a joint CTC-attention model described in the paper by Kim et al., "Joint CTC-attention based end-to-end speech recognition using multi-task learning," in Proc. ICASSP, 2017, pp. 4835-4839, the entire contents of which is hereby incorporated by reference as if fully set forth herein. Like the joint CTC-attention model, conformer CTC attention model 304 is composed of a CTC module, an attention decoder, and a shared encoder. However, instead of a transformer-based encoder like that used in the joint CTC-attention model, model 304 uses conformer-based encoder 306. Conformer encoder 306 is composed of multiple conformer blocks 312 having context that spans a full acoustic utterance (e.g., a spoken word, phrase, or sentence from media file 116). Conformer encoder 306 including conformer block 312 is described in greater detail in the paper by Gulati et al, "Conformer: Convolution-augmented transformer for speech recognition," arXiv preprint arXiv: 2005.08100, 2020, the entire contents of which is hereby incorporated by reference as if fully set forth herein. In some examples, each conformer block 312-1, 312-2, . . . , 312-N encompasses two feed-forward modules that sandwich the multi-headed self-attention module and the convolution module.

In some examples, a convolution frontend composed of Conv2D layers down samples input features 302 representing the full acoustic utterance. Input features 302 can be down sampled by a factor of four, for example. Down sampled input features 302 are then input to shared conformer encoder 306. The input features 302 can be based on per-audio frame Mel-scale filter bank coefficients, log-Mel filter banks, Mel-spectrograms, or the like.

In some examples, CTC 308 include a linear layer with softmax activation. The linear layer with softmax activation transforms the output of shared conformer encoder 306 (shared with transformer decoder 310) to a final output distribution over a set of sub words. The set of sub word units can be generated by a sub word-based tokenization algorithm. In some examples, the set of sub word units are a set of WordPiece units generated by the WordPiece algorithm. WordPiece is a sub word segmentation algorithm used in natural language processing. A base vocabulary is initialized with individual characters in a set of one or more texts which can include custom vocabulary 114. Then, the most frequent combinations of symbols in the vocabulary are iteratively added to the vocabulary. More information on the WordPiece algorithm is available in the following paper by Wu et al., "Google's Neural Machine Translation System: Bridging the Gap Between Human and Machine Translation," arXiv:1609.08144v2, Oct. 8, 2016, the entire contents of which is hereby incorporated by reference.

As used herein, the term "sub word" refers to a character n-gram such as a single word (e.g., "room"), a hyphenated word (e.g., "up-to-date"), a concatenated word (e.g., "dogsandcats"), an open compound word ("living room"), or a hyphenated open compound word (e.g., "sub-bleached curtains"), or a part of (one or more characters of) any of these types of words. A sub word can also be composed of special symbols such as a blank symbol for use in recovering a word sequence from a sequence of sub words. For example, in the sub word sequence [1: "a_", 2: "tall", 3: "er_", 4: "man"), "a_", "tall", "er_", and "man" are each sub words. The special blank symbol "_" facilitates recovery of the word sequence ("A taller man") by indicating which sub words in the sub word sequence are the end of words and should be followed by a space in the recovered word sequence.

In some examples, attention decoder 310 includes a transformer decoder block and a softmax layer whose outputs are compared against reference outputs using a Cross-Entropy (CE) loss, represented as CE Loss of joint CTC-attention loss 316. The shared conformer encoder 306, CTC 308, and attention decoder 310 are jointly modeled (trained). The reason behind this joint modeling (training) is to use a CTC objective function as an auxiliary task to train shared conformer encoder 306 within the multitask learning (MTL) framework. The training (learning) loss of model 304 can be represented by the following equation:

$$L_{MTL} = \alpha L_{CTC} + (1-\alpha) L_{Att}$$

In the above equation, $L_{MTL}$ represents the multi-task learning loss of model 304 and is represented in FIG. 3 as joint CTC-attention loss 316. $L_{CTC}$ represents the CTC loss of joint CTC-attention loss 316. $L_{Att}$ represents the CE loss of joint CTC-attention loss 316. The parameter $\alpha$ is a configurable parameter and represents the weight of the CTC loss of joint CTC-attention loss 316 with a value between zero and one.

In some examples, only CTC 308 and shared conformer encoder 306 of jointly trained model 304 are used at inference time and transformer decoder 310 is not used at inference time. However, attention decoder 310 can be used in a second pass at inference time to potentially give a more accurate result.

Phone Alignment with Conformer Encoder

In some examples, the outputs of CTC 308 which include sub word units and blank symbols can be collapsed and concatenated to form final word-level output. However, accurate recognition of rare and OOV words from sub word units is a challenge. In some examples, a phone prediction model is used to meet this challenge.

In some examples, the phone prediction model is a supplementary context independent phone recognizer based on a Recurrent Neural Network Transducer (RNN-T) model described in the paper by Zhao et al., "On Addressing Practical Challenges for RNN-Transducer," arXiv preprint arXiv:2105.00858, 2021, the entire contents of which is hereby incorporated by reference as if fully set forth herein. In some examples, phone alignment network 318 can be jointly trained with conformer CTC-attention model 304 using the outputs of shared conformer encoder 306 shared with CTC decoder 308 and attention decoder 310. In some examples, this involves per-frame phone alignments derived from a hybrid-system and a pronunciation lexicon. As shared conformer encoder 306 may operate at a low frame rate because of the down sampling applied to input features 302, the outputs of shared conformer 306 that are provided to phone alignment network 318 can be up sampled so that phone alignment network 318 can operate at a full frame rate. This up-sampling can be accomplishing using up sampling convolutional layers (ConvTranspose1D) to transform the low-frame rate encodings output by shared conformer encoder 306 to full-frame rate.

In some examples, per-frame phone posteriors predicted from phone alignment network 318 are optimized using a cross-entropy (CE) loss and the resulting modified MTL loss can be represented by the following equation:

$$L_{MTL} = \alpha((1-\beta)L_{CTC} + \beta L_{Ali}) + (1-\alpha)L_{Att}$$

In the above equation, $L_{Ali}$ represents the phone alignment network 318 loss represented by CE Loss of phone targets 320. The parameters $\alpha$ and $\beta$ are tunable parameters and represents the weights of the CTC Loss of joint CTC-attention loss 316 (e.g., the loss $L_{CTC}$) and the CE Loss of phone targets 320 (e.g., the loss $L_{Ali}$), respectively. The parameters $\alpha$ and $\beta$ can each be tuned (e.g., user configure) to a value between zero and one.

In some examples, a pre-trained conformer CTC-attention model 304 is used. In this case, network 318 can be trained with model 304 frozen.

Greedy Sub-Word Boosting

In some examples, a greedy sub-word boosting algorithm is applied to the output predictions of CTC 308 at inference time. This boosting is done to correct errors that can occur in the output predictions of CTC 308 especially with long tail and out-of-vocabulary words. FIG. 4 depicts examples of three types of errors that can occur in the output predictions of CTC 308 with long tail and out-of-vocabulary words, according to some examples. The output predictions can also contain a combination of these types of errors. FIG. 5 depicts pseudo-code of the greedy sub word boosting algorithm, according to some examples.

A first type of error is substitutions (Sub). Substitutions are cases where an incorrect sub-word is recognized in place of a correct sub-word. An example of this is the popsocket example in FIG. 4. In such cases, as reflected by the algorithm of FIG. 5, if a prefix forms part of the chosen vocabulary, then the greedy sub-word boosting algorithm can perform sub word boosting with a fixed probability if the next sub word is in the top-K list of sub words sorted on posterior probabilities.

A second type of error is deletions (Del). Deletions are cases where blank tokens are over-hypothesized. As a result of the over-hypothesis, the number of sub word tokens in the final hypothesis can be less than in the reference. The kazakhstan example of FIG. 4 is an example of this. To address this issue, as reflected by the algorithm of FIG. 5, the greedy sub-word boosting algorithm boosts a non-blank sub word if it exists in the top-K, thereby fixing a deletion error that occurred in its place. A high boosting probability for deletion may lead to several false positives. Therefore, the boosting probability can require careful tuning with respect to development data and the particular implementation at hand.

A third type of error is insertions (Ins). Insertions are those cases where the number of sub words in the hypothesis is more than in the reference. The putin example of FIG. 4 is an example of this. In such cases, as reflected by the algorithm of FIG. 5, the greedy sub word boosting algorithm can boost the blank token if it exists in the top-K, thereby fixing an insertion error. Insertion errors may not be frequently observed and the boosting probability for the same can be tuned with respect to development data and according to the requirements of the particular implementation at hand.

Adaptive Sub-Word Boosting in Beam Search Decoding

The process of tuning boosting probabilities for use in the greedy sub word boosting algorithm can lead to inconsistent results and may be considered a sub-optimal approach. Accordingly, in some examples, an adaptive on-the-fly boosting of the vocabulary at hand is performed at inference time. The adaptive boosting encompasses biasing at the sub word level during a beam search decoding before a pruning stage. The beam search decoder performs a beam-search with beam thresholding, histogram pruning, and language model smearing as described in the paper by Liptchinsky, "Letter-Based Speech Recognition with Gates ConvNets," arXiv preprint arXiv:1712.09444, 2017, the entire contents of which is hereby incorporated by reference as if fully set forth herein.

In some examples, the beam search decoder can use a language model toolkit such as, for example, KenLM or the like, for language modeling. More information on KenLM is available in the following paper by Heafield et al., "Scalable modified kneser-ney language model estimation," In Annual Meeting of the Association for Computational Linguistics (ACL), pages 690-696, 2013, the entire contents of which is hereby incorporated by reference as if fully set forth herein.

The beam search decoder can accept unnormalized acoustic scores (e.g., transitions and emissions from the acoustic model) as input and can attempt to maximize the following equation:

$$L(\theta) = \text{logadd}_{\pi \in G_{lex}(\theta,T)} \sum_{t=1}^{T} \left( f_{\pi_t}(x) + g_{\pi_{t-1},\pi_t}(x) + h_{\pi_t}(x) \right) + \alpha \log P_{lm}(\theta) + \beta |\{i \mid \pi_i = \#\}|$$

In the above equation, $G_{lex}(\theta, T)$ represents a graph constrained by a base lexicon over T audio frames for a given transcription $\theta$. And $\pi=\pi_1, \ldots, \pi_t \in G_{lex}(\theta, T)$ represents a path in the graph representing a valid sub word sequence for the transcription. At each time step t, $f_{\pi_t}(x)$ represents the log-probability by CTC 308 given an acoustic sequence x. And $h_{\pi_t}(x)$ represents the additional boosting score. And $P_{lm}(\theta)$ represents the probability of the language model given the transcription $\theta$. The tunable (e.g., user configurable) parameters $\alpha$ and $\beta$ represent hyperparameters that control the weight of the language model and the silence insertion penalty (#), respectively.

According to some examples, $\hat{y}(t, k)$ represents the log-probability distribution output by CTC 308 in sorted order at time t, with k representing the sub word candidate index in the top-K list. In some examples, a trie data structure trie($T_{vocab}$) constructed from the given test vocabulary is used to compute the boosting score. The rest of the sequence is boosted if the first sub word (trie node) occurs in the top-K list. The boosting score $h_{\pi_t}(x)$ for each sub word candidate at time stamp t can be determined dynamically by its difference in log-probability with the top-1 hypothesis. Specifically, the additional boosting score $h_{\pi_t}(x)$ can be represented as:

$$h_{\pi_t}(x) = \begin{cases} \delta * (\hat{y}(t, k) - \hat{y}(t, 1)), & \pi_t \in T_{vocab} \\ 0, & \text{Otherwise} \end{cases}$$

In the above equation, the parameter $\delta$ represents the boosting scale. To reduce false positives, the following inverse sigmoid function can be followed for computing the boosting scale:

$$\delta = 1/(1+e^{(\hat{y}(t,k)-\hat{y}(t,1)-0.5*k)/0.1*k})$$

Unigram Boosting

In some examples, unigram boosting is performed. Unigram boosting can encompass modifications to the external N-gram language model before performing fusion with the beam search decoder. In some examples, OOV words as added to the external language model with a fixed high unigram probability to achieve biasing. This can alternatively be achieved by adding a OOV class (as opposed to adding all words) to keep the external language model unmodified during inference. In addition to adding OOV words, common and rare (long tail) words can be added.

Phone Alignment Network for Biasing

In some examples, a biasing technique using the per-frame phoneme output predictions from the phone alignment network 318 is used. Two biasing techniques are contemplated: (1) phonetic distance-based rescoring, and (2) pronunciation-based lexicon lookup.

Phonetic Distance-Based Rescoring

While unigram boosting can be helpful, in higher order N-grams, rare and OOV words can be still be considered unknown tokens. Testing has indicating that the words that are boosted during on-the-fly rescoring are less preferred due to shallow fusion with an external language model. Accordingly, in some examples, a phonetic distance-based rescoring of N-best lists to bias those hypotheses that contain rare and OOV words. To achieve this, N-best lists from the CTC decoder are generated by performing shallow fusion with an external language model. Then a dynamic time warping (DTW) algorithm is used to perform force alignment of each hypothesized phone sequences from N-best list to per-frame phone posteriors generated from phone alignment network 318.

In some examples, a single/silence/phone is inserted between each word to allow for pauses between words during the force alignment. The cost computed during the dynamic time warping alignment can be used for rescoring the N-best lists. In some examples, a fixed scale of 0.1 is used for dynamic time warping cost during rescoring.

Pronunciation-Based Lexicon Lookup

In some examples, a phonetic lexicon or a clustered context-dependent acoustic target is used to recognize long-tail words. The phone predictions can be more accurate that sub word predictions for rare and OOV words. In some examples, the 1-best hypothesis can be taken from CTC decoder 308 after performing phonetic distance-based rescoring and tokenized into words. The word boundaries generated during force alignment can be used to retrieve corresponding per-frame phone predictions. Window-based smoothing can then be performed to replace any spurious predictions and collapse consecutive repetitive predictions into a single phone. The pronunciation obtained in this way can be compared to a lexicon-derived pronunciation of each vocabulary from the user-provided biasing list. If an exact match is found, the word in the 1-best hypothesis is replaced with the matched vocabulary.

Leveraging Phoneme Similarity

In some examples, G2G is leveraged to generate additional pronunciation variants for domain-specific entities during decoding. In some examples, few variants are generated using phoneme similarity and decomposed into sub words while maintaining the word-level label. By doing so, the probability of predicting the actual word slightly improves with an increase in the number of unique G2G variants.

Experimental Implementation

FIG. 6 presents qualitative examples of the improvement of a proposed model over a baseline model, according to some examples. The proposed model includes multi-task encoder for conformer CTC personalization model 300 with (1) on-the-fly dynamic adaptive boosting of sub words in combination with a prefix beam search decoder, (2) the phone alignment network and biasing the sub word predictions at inference time by utilizing phoneme and sub world level output predictions, and (3) leveraging G2G to generate additional pronunciation variants to address unseen decomposition of rare words during training. Like the proposed model, the baseline model includes multi-task conformer CTC-attention model 304 but without these three additions (1), (2), and (3) that are included in the proposed model. The bolded words in the transcription of the utterances produced by the baseline model are incorrect transcriptions while the bolded words in the transcript of the utterances produced by the proposed model are the corresponding correct transcriptions.

Automatic Speech Recognition System

Figure 7:
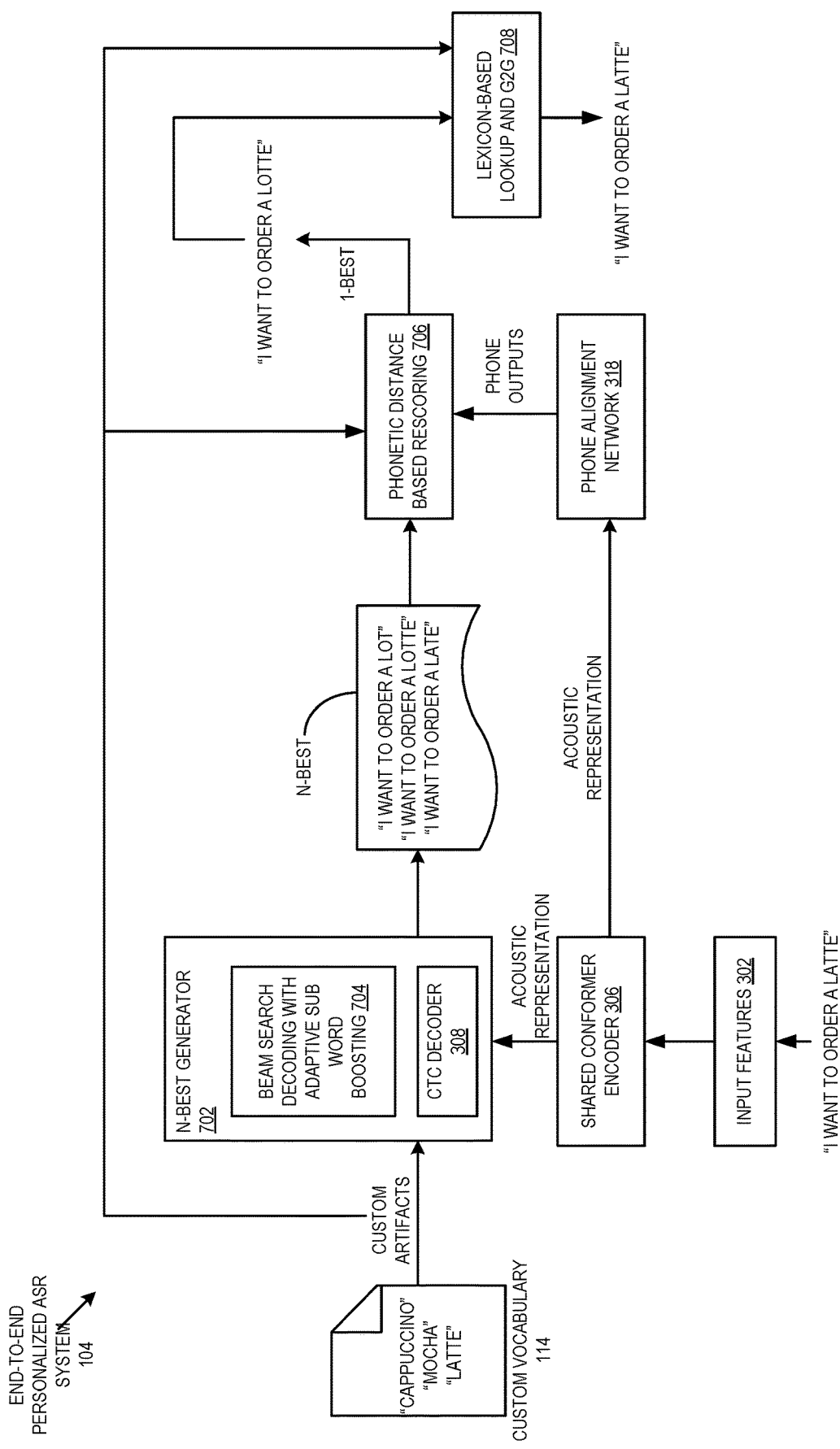
FIG. 7 illustrates an automatic speech recognition system, according to some examples.

FIG. 7 illustrates automatic speech recognition system (ASR) 104 with on-the-fly customer specific tuning at inference time, according to some examples. Beneficially, system 700 does not require retraining to meet customer-specific use cases. In this example, system 700 is used with an example of a custom vocabulary containing words pertaining to a coffee domain. However, system 700 could be used with other custom vocabularies pertaining to different domains and without having to retrain system 700 for those domains.

System 700 includes trained shared conformer encoder 306, CTC 308 trained as a decoder (CTC decoder 308) with beam search decoder with adaptive sub word boosting module 704, custom artifacts generation module, phone alignment network 318, phonetic distance-based rescorer 706, and lexicon-based lookup and G2G module 708.

In some examples, a customer provides custom vocabulary 114 containing words that the customer anticipates being present in speech inputs (e.g., utterances) and that should be recognized with high certainty. In this simple example, customer vocabulary 114 includes the words "cappuccino," "mocha," and "latte." Custom vocabulary 114 can contain a set of words, either individually or as part of phrases or sentences. In addition to a set of words, custom vocabulary 114 can contain data representing custom pronunciations of words in the set. For example, custom vocabulary 114 can contain sounds like data. Words in custom vocabulary 114 can include rare and out-of-vocabulary words. A rare word can be a word that is included a base vocabulary used by system 104 but that did not occur often (according to a long-tail distribution) in the training data used to train system 104. An out-of-vocabulary word can be a word that is not included in the base vocabulary used by system 104. Custom vocabulary 114 can include both rare words and out-of-vocabulary words. The term "custom word" is used herein to refer to a rare or out-of-vocabulary word in custom vocabulary 114.

In some examples, system 104 generates custom artifacts from custom vocabulary 114. The custom artifacts represent data of custom vocabulary 114 but in a data format that is more easily or more efficiently processed by system 104. In some examples, the custom artifacts include a custom lexicon. The custom lexicon can include words in the custom vocabulary 114 broken down into sub word sequences. The custom artifacts can also include a mapping of common sub words from a base or general lexicon to custom sub words in the custom lexicon. The mapping can be based on phonetics and reflect similar sounding sub words. The mapping can be generated using the G2G techniques referenced herein. In some examples, phonetic distance-based rescorer 706 converts sub words in N-best list into phone sequences. For this, the custom artifacts generated can include phone sequences for sub word sequences in custom vocabulary 114 that are provided to rescorer 706.

In some examples, input features 302 representing a spoken utterance (in this example "I want to order a latte") are input to shared conformer encoder 306. Encoder 306 processes input features 302 and produces an acoustic representation (e.g., embedding) of input features 302 as a result. The acoustic representation is input to N-best generator 702. CTC decoder 308 applies a linear plus softmax layer to the acoustic representation. Beam search decoding with adaptive sub word boosting is applied to the output of CTC decoder 308 to produce an N-best list of sub word sequences. The adaptive sub word boosting component of the beam search decoding aids to boost sub word sequences that are prefixes of sub word sequences representing custom words in custom vocabulary 114 during beam search decoding before the pruning stage.

In some examples, beam search decoding encompasses predicting at each time frame the top-N most probable sub word sequences based on the softmax probabilities generated by CTC decoder 308. In some examples, the beam size is ten but can be more or less according to the requirements of the particular implementation at hand. For example, the top-N predicted for a time step (frame) t can be less than N (e.g., ten) if probability thresholding is applied such that candidates with less than a threshold probability are not selected (e.g., discarded). A top-N can be predicted by the beam search decoder for each time step t of a number of time steps spanning the utterance being transcribed (e.g., "I want to order a latte"). At time step t, a first set of up to top-N sub word sequence candidates are predicted. At step t+1, a second set of up to top-N sub words are predicted. Also, at step t+1, the joint probabilities of the first set and the second set are computed resulting in up to N cross N joint probabilities. For example, if ten sub word sequence candidates are predicted at time step t and ten sub word candidates are predicted at time step t+1, the one hundred joint probabilities are computed at time step t+1. Also, at step t+1, thresholding (pruning) is applied to the N cross N joint probabilities to select the top-N most probable from the N cross N joint probabilities before moving on to the next time step t+2. This is done at each time step starting with the second time step in the sequence of time steps representing the utterance before moving on to the next time step in the sequence.

In some examples, beam search decoding with adaptive sub word boosting entails building a data structure for tracking during beam search decoding at the sub word level whether a prefix of a word in custom vocabulary 114 is being decoded. In some examples, the data structure is a trie data structure built based on the sub word sequences in the custom lexicon generated for the words in custom vocabulary 114. For a given time step t, sub word sequences representing the spoken utterance can be generated by the beam search decoding. Each sub word sequence in the has a joint probability based on the product of the respective sub word probabilities of each sub word in the sequence where the sub word probabilities are determined from the output of the CTC decoder 308. In some examples, the joint probability of a sub word sequence for the given time step t is boosted by a boost amount if the sub word sequence is a prefix of a sub word sequence for a custom word in custom vocabulary 114. A sub word sequence may be selected for inclusion in the set of top-N sub word sequences to be passed on to the next iteration of the beam search decoding for the next time step t+1 based on the boosted joint probability of the sub word sequence. In other words, a candidate sub word sequence that might not otherwise be included in the top-N sub word sequences for the next time step t+1 because of its relatively low joint probability can be included in the top-N sub word sequences for the next time step t+1 if the sub word sequence is a prefix of a sub word sequence for a custom word in custom vocabulary 114.

In some examples, the boost amount is predetermined (fixed). However, in some examples, the boost amount for a given sub word sequence at a time step t is dynamically determined on-the-fly based on the difference between the boosted joint probability of the given sub word sequence and the joint probability of the top-1 sub word sequence candidate at the time step t. In some examples, the boost amount is further increased if the given sub word sequence is a prefix of a specially boosted custom word in custom vocabulary 114. The additional boost amount for a specially boosted sub word can be fixed or base on an indicator of the magnitude of the special boost for the custom word specified in custom vocabulary 114.

In some examples, system 104 includes phone alignment network for predicting phone outputs from the acoustic representation output by shared conformer encoder 306. The phone outputs can include per-frame phone posteriors. Phonetic distance-based rescoring module 706 uses the phone outputs from phone alignment network 318 to rescore the N-best list obtained from N-best generator 702. The top scoring sub word sequence (1-best) of the rescored N-best list is determined after phonetic distance-based rescorer 706 has rescored the N-best list produced by N-best generator 702. Lexicon-based lookup and G2G module 708 is then applied to the 1-best to perform pronunciation-based lexicon lookup and to leverage phoneme similarity via G2G.

The N-best list output by the beam search decoding may contain a boosted sub word sequence corresponding to a proper transcription of the spoken utterance where the proper transcription contains a rare or out-of-vocabulary word in custom vocabulary 114. However, the boost amount may have been such that the sub word sequence, while pushing it into the N-best, was not enough to make the sub word sequence the 1-best in the N-best.

According to some examples, it is hypothesized that the phone alignment network 318 can be more accurate than N-best generator 702 for rare and out-of-vocabulary words because of a potential bias of CTC-attention model 304 toward common vocabulary words as a result of its training based on a training data set that contains relatively many occurrences of common words but few or no occurrences of rare and out-of-vocabulary words in custom vocabulary 114.

In some examples, phonetic distance-based rescorer 706 converts the sub word sequences of the N-best list into corresponding phone sequences to yield a N-best list of phone sequences. This conversion can be done using a lexicon (e.g., of the customer artifacts) or G2G model. A distance between each phone sequence in the N-best list of phone sequences and a "target" phone sequence representing the phone outputs of phone alignment network 318 is computed using a dynamic time warping algorithm. Recall that the phone outputs of phone alignment network 318 are generated based on the acoustic representation of input features 102 generated by shared conformer encoder 306. The distance computed for a phone sequence in the N-best list and the target phone sequence represents a degree of alignment between the phone sequence in the N-best list and the target phone sequence. The N-best list of sub word sequences may be rescored based on their corresponding distances computed by the phonetic distance-based rescorer 706. In doing so, a sub word sequence in the original N-best list output by the beam search decoding may be ranked higher in the rescored N-best list if the distance between its corresponding phone sequence and the target phone sequence is relatively close. On the other hand, a sub word sequence in the original N-best list output by the beam search decoding may be ranked lower in the rescored N-best list if the distance between its corresponding phone sequence and the target phone sequence is relatively far.

In some examples, the output of phonetic distance-based rescorer 706 is the sub word sequence having the best score after phone distance-based rescorer 706 has rescored the original N-best list output by the beam search decoding. The score for sub word sequence can be computed based on a combination of the probability of the sub word sequence because of the beam search decoding and the distance of the phone sequence generated for the sub word sequence from the target phone sequence.

In some examples, lexicon-based lookup and G2G module 708 takes the 1-best sub word sequence output by phonetic distance-based rescorer 706 as input. The 1-best sub word sequence is tokenized into words to form a 1-best hypothesis. Then, word boundaries generated during force alignment by phonetic distance-based rescorer 706 are used to retrieve corresponding per-frame phone predictions. Window-based smoothing is performed to replace any spurious predictions and to collapse consecutive repetitive predictions into a single phone. The pronunciation obtained this way is compared to a lexicon-derived pronunciation of custom words of custom vocabulary 114. If an exact match is found, the word in the 1-best hypothesis is replaced with the matched custom word. For example, in FIG. 7, the word "lotte" in the 1-best hypothesis may be replaced with the word "latte" from custom vocabulary 114.

In some examples, lexicon-based lookup and G2G module 708 uses G2G to generate additional pronunciation variants for custom words. The custom words are decomposed into sub word sequences while maintaining word-level labels. The probability of predicting the actual word can be improved with an increase in the number of unique G2G variants.

In various examples described herein, ASR system 104 is described and depicted as a component of a provider network service (e.g., transcription service 102). However, in some examples, ASR system 104 can be a component of an edge electronic device such as, for example, user device 122. In this case, the techniques disclosed herein for batch and streaming speech-to-text transcription of audio can be performed at the edge electronic device without having to send or stream the audio data over intermediate network 120 to provider network 100. Instead, ASR system 104 at the edge device can generate transcript 112 at the edge device based on audio data received by the user device 122 (e.g., as captured by a microphone of or coupled to user device 122). In this case, user device 122 can still download custom vocabulary 114 from storage service 108 of provider network 100 and upload the generated transcript 112 to storage service 108 of provider network. In addition, user device 122 can download from provider network 100 pre-trained ML models used in ASR system 104 (e.g., pre-trained multi-task encoder for conformer CTC personalization model 300). Thus, the techniques disclosed herein can be implemented both in the cloud or at the edge.

Provider Network

Figure 8:
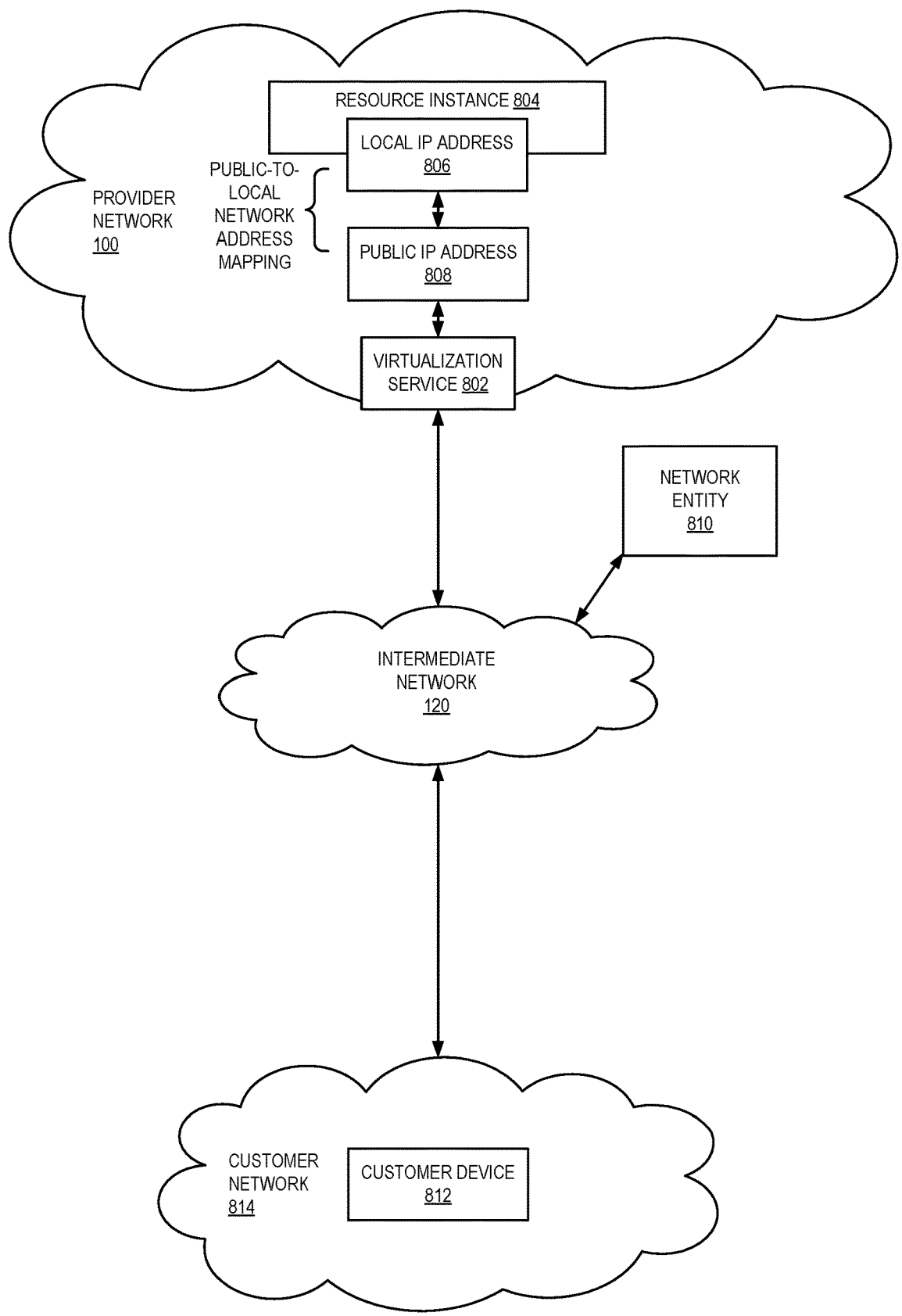
FIG. 8 illustrates a provider network environment in which the techniques disclosed herein can be implemented, according to some examples.

FIG. 8 illustrates a provider network environment in which the techniques disclosed herein can be implemented, according to some examples. Provider network 100 can provide resource virtualization to a customer of provider network 100 via virtualization service 802. Virtualization service 802 can allow the customer to purchase, rent, subscribe to, or otherwise obtain use of resource instance 804. Resource instance 804 can include, but is not limited to, a compute, storage, or network resource. Resource instance 804 can be implemented by an electronic device in a datacenter within provider network 800. The datacenter can be a physical facility or building that houses compute, storage, and network infrastructure. Provider network 100 can encompass many resource instances implemented by many electronic devices distributed over a set of datacenters located in different geographic regions or locations. An example of an electronic device is device 900 described below with respect to FIG. 9.

Examples of resource instance 804 include a virtual machine (VM) and a container. A virtual machine can be a compute resource that uses software instead of a physical computer to run a program and deploy an application. A virtual machine (sometimes called a "guest") can run on a single physical machine (sometimes called the "host"). A virtual machine can execute its own operating system (e.g., UNIX, WINDOWS, LINUX, etc.) and can function separately from other virtual machines, including those on the same host. A virtual machine can be a substitute for a physical machine. A host's physical resources can be shared between multiple virtual machines each running its own copy of an operating system. Access to and use of the host's physical resources (e.g., hardware processor and physical memory resources) by the multiple virtual machines is coordinated by a virtual machine monitor (sometimes called a "hypervisor"). The hypervisor itself can run on the bare hardware of the host or as a process of an operating system that runs on the bare hardware.

A container is like a virtual machine with respect to running separate applications on a single platform. However, a container typically packages a single application along with its runtime dependencies and libraries, while a virtual machine virtualizes the hardware to create a "computer." Another difference is that a container system typically provides the services of an operating system kernel that runs on the bare hardware of the underlying host to containers that share the kernel services as orchestrated by the container system. The container system itself runs on the host with the aid of the operating system kernel and isolates the containers from each other to a certain degree. While a container can be used independently of a virtual machine, a container and a virtual machine can be used together. For example, a container can run on an operating system that runs on a virtual machine.

Within provider network 100, local Internet Protocol (IP) address 806 can be associated with resource instance 804. Local IP address 806 can include an internal or private network address in provider network 800. Local IP address 806 can be an IPV4 or IPv6 address, for example. For example, local IP address 806 can be one reserved by Internet Engineering Task Force (IETF) Request for Comments (RFC) 1918 or having an address format specified by IETF RFC 4193 and can be mutable within provider network 100.

Network traffic originating outside provider network 100 (e.g., from network entity 810 or customer device 814) that is destined for resource instance 804 typically is not directly routed to local IP address 806. Instead, the network traffic is addressed to public IP address 808. Public IP address 808 is mapped by provider network 100 to local IP address 806 using network address translation (NAT) or similar technology.

Using customer device 812 in customer network 814, the customer can use virtualization service 802, resource instance 804, local IP address 806, and public IP address 808 to implement a customer-specific application and offer the application to one or more network entities (e.g., network entity 810) on intermediate network 120 such as, for example, the Internet. Network entity 810 can then generate network traffic destined for the application by addressing the network traffic for public IP address 808. The traffic can then be routed via intermediate network 120 to the datacenter of provider network 800 that houses the electronic device that implements resource instance 804. Within the data center, the traffic can be routed to local IP address 806 where the traffic is received and processed by resource instance 804.

Response network traffic from resource instance 804 can be routed back onto intermediate network 840 to network entity 820.

In some examples, user device 122 of FIG. 1 can be customer device 812. In some examples, personalized ASR system 104 of FIG. 1 can be implemented by resource instance 804.

Electronic Device

Figure 9:
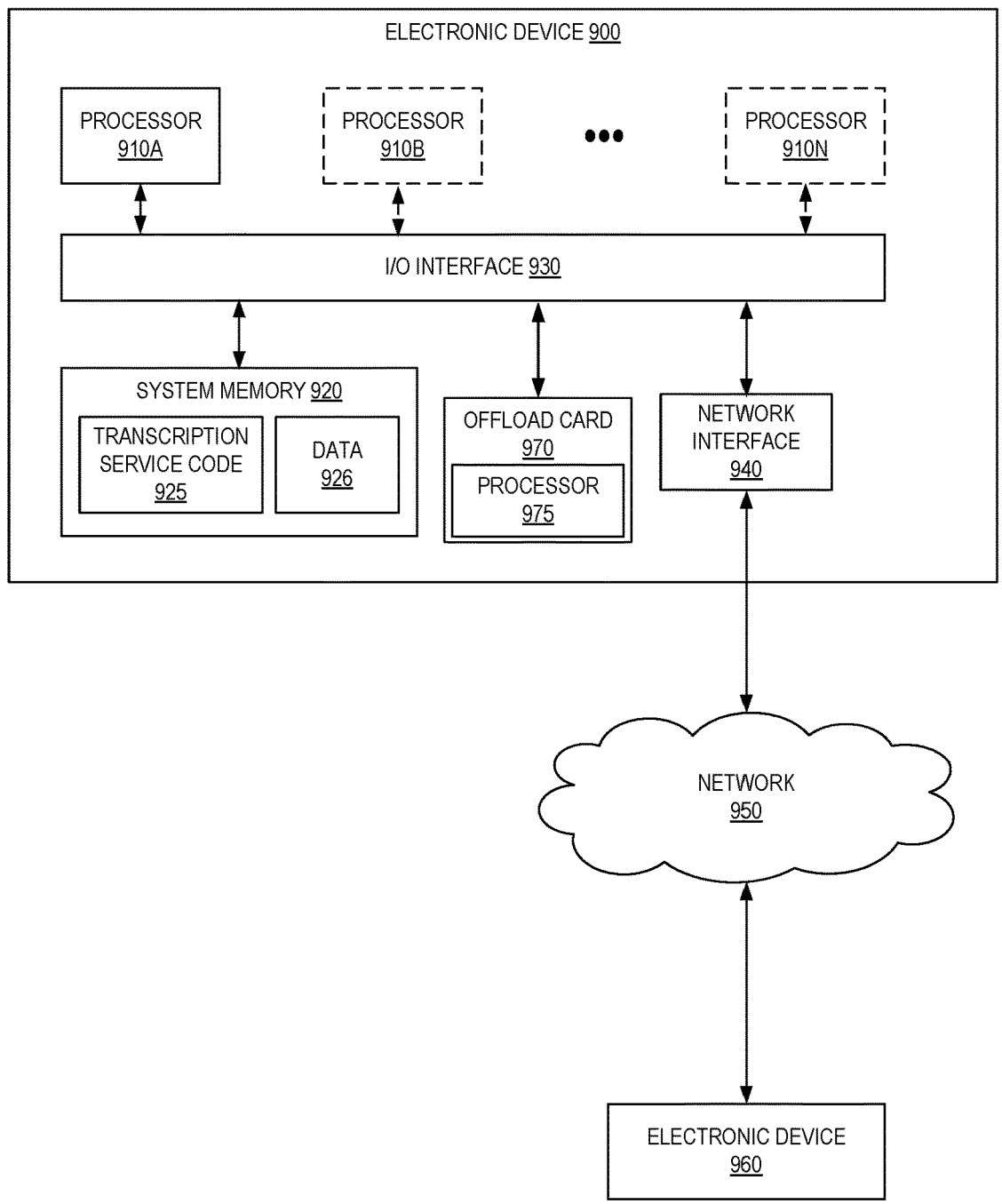
FIG. 9 illustrates an electronic device that can be used in an implementation of the techniques disclosed herein, according to some examples.

FIG. 9 illustrates electronic device 900 that can be used in an implementation of the techniques disclosed herein, according to some examples. Device 900 can include a set of one or more processors 910A, 910B, . . . , 910N coupled to system memory 920 via input/output (I/O) interface 930. Device 900 can further include network interface 940 coupled to I/O interface 930.

Device 900 can be a uniprocessor system including one processor 910A or can be a multiprocessor system including multiple processors 910A, 910B, . . . , 910N. Each of processors 910A, 910B, . . . , 910N can be any suitable processor capable of executing instructions. For example, in various embodiments, each of processors 910A, 910B, . . . , 910N can be general-purpose or embedded processor implementing any of a variety of instruction set architectures (ISAs), such as the X86, ARM, POWERPC, SPARC, or MIPS ISAs, or any other suitable ISA.

System memory 920 can store instructions and data accessible by processors 910A, 910B, . . . , 910N. In some examples, system memory 920 can be implemented using any suitable memory technology, such as random-access memory (RAM), static RAM (SRAM), synchronous dynamic RAM (SDRAM), nonvolatile or Flash-type memory, or any other type of memory. In some examples, program instructions and data implementing a desired function, such as a method, process, act, or operation of the techniques disclosed herein, are stored within system memory 920 as transcription service 925 (e.g., executable to implement, in whole or in part, a method, process, act, or operation of transcription service 102 disclosed herein) and data 926.

I/O interface 930 can be configured to coordinate I/O traffic between processors 910A, 910B, . . . , 910N, system memory 920, and any peripheral devices in device 900, including network interface 940 or other peripheral interfaces (not shown). I/O interface 930 can perform any necessary protocol, timing, or other data transformations to convert data signals from one component (e.g., system memory 920) into a format suitable for use by another component (e.g., processors 910A, 910B, . . . , 910N). I/O interface 930 can include support for devices attached through various types of peripheral buses, such as a variant of the PERIPHERAL COMPONENT INTERCONNECT (PCI) bus standard or the UNIVERSAL SERIAL BUS (USB) standard, for example. The function of I/O interface 930 can be split into two or more separate components, such as a north bridge and a south bridge, for example. Also, some of the functionality of I/O interface 930, such as an interface to system memory 920, can be incorporated directly into processors 910A, 910B, . . . , 910N.

Network interface 940 can be configured to allow data to be exchanged between device 900 and another electronic device 960 attached to network 950. Network interface 940 can support communication via any suitable wired or wireless general data networks, such as a type of Ethernet network, for example. Additionally, network interface 940 can support communication via telecommunications or telephony networks, such as analog voice networks or digital fiber communications networks, via storage area networks (SANs), such as FIBRE CHANNEL SANS, or via any other suitable type of network or protocol.

Device 900 can include offload card 970 including processor 975, and possibly including a network interface, that is connected using I/O interface 930 (e.g., a bus implementing a version of the PERIPHERAL COMPONENT INTERCONNECT—EXPRESS (PCI-E) standard, or another interconnect such as a QUICKPATH INTERCONNECT (QPI) or ULTRAPATH INTERCONNECT (UPI)). For example, device 900 can act as a host electronic device (e.g., operating as part of a hardware virtualization service) that hosts compute resources such as compute instances, and offload card 970 can execute a virtualization manager that can manage compute instances that execute on the host electronic device. As an example, offload card 970 can perform compute instance management operations, such as pausing or un-pausing compute instances, launching or terminating compute instances, performing memory transfer/copying operations, etc. These management operations can be performed by offload card 970 in coordination with a hypervisor (e.g., upon a request from a hypervisor) that is executed by other processors 910A, 910B, . . . , 910N of device 900. However, the virtualization manager implemented by offload card 970 can accommodate requests from other entities (e.g., from compute instances themselves).

System memory 920 can be a computer-accessible medium configured to store program instructions and data. However, program instructions or data can be received, sent, or stored upon different types of computer-accessible media. Computer-accessible media includes non-transitory computer-accessible media and computer-accessible transmission media. Examples of non-transitory computer-accessible media include volatile or non-volatile computer-accessible media. Volatile computer-accessible media includes, for example, most general-purpose random-access memory (RAM) including dynamic RAM (DRAM) and static RAM (SRAM). Non-volatile computer-accessible media includes, for example, semiconductor memory chips capable of storing instructions or data in floating-gate memory cells composed of floating-gate metal-oxide-semiconductor field effect transistors (MOSFETs), including FLASH memory such as NAND flash and solid-state drives (SSD). Other examples of non-volatile computer-accessible media include read-only memory (ROM), erasable programmable ROM (EPROM), electrically erasable programmable ROM (EEPROM), ferroelectric RAM, and other computer data storage devices (e.g., disk storage, hard disks drives, optical discs, floppy disks, and magnetic tape).

Extensions and Alternatives

In the foregoing detailed description, numerous specific details have been sort forth to provide a thorough understanding of the claimed subject matter. However, it will be understood by those skilled in the art that claimed subject matter may be practiced without these specific details. In other instances, well-known elements, features, acts, or operations have not been described in detail.

Ordinal terms such as first, second, etc. may be used in the foregoing description and in the appended claims to describe various elements, features, acts, or operations. Unless the context clearly indicates otherwise, such elements, features, acts, or operations are not limited by those terms. The terms are used only to distinguish one element, feature, act, or operation from another. For example, a first device could be termed a second device. Similarly, a second step could be termed a first step. The first device and the second device are both devices, but they are not the same device. Likewise, the second step and the first step are both steps, but not the same step.

Unless the context clearly indicates otherwise, as used in the foregoing description and in the appended claims, the singular forms "a," "an," and "the" are intended to include the plural forms as well.

Unless the context clearly indicates otherwise, as used in the foregoing description and in the appended claims, the terms "comprising," "including," "having," "based on," "encompassing," and other like terms, are used in the foregoing description and in the appended claims in an open-ended fashion, and do not exclude additional elements, features, acts, or operations.

In the case of "based on," the term is used in the foregoing description and in the appended claims in some instances to identify a causal relationship between stated steps, acts or operations. Unless the context clearly indicates otherwise, "A based on B" in these instances means that the performance of step, act, or operation B causes the performance of step, act, or operation A. The causal relationship can be direct (via no intermediate steps, acts, or operations) or indirect (via the performance of one or more intermediate steps, acts, or operations). However, unless the context clearly indicates otherwise, the term "A based on B" is not intended to require the performance of B be necessary in all cases to cause the performance of A, and A may be performed in some cases without being caused by the performance of B. In those cases, however, A would not be based on B even though in other cases A is based on B. Likewise, unless the context clearly indicates otherwise, the term "A based on B" is not intended to require the performance of B by itself be sufficient in all cases to cause the performance of A, and one or more other steps, acts, or operations in addition to B may be performed in some cases to cause the performance of A. In such circumstances, A can still be based on B even though the performance of multiple steps, acts, or operations including B cause A.

Unless the context clearly indicates otherwise, the term "or" is used in the foregoing description and in the appended claims in its inclusive sense (and not in its exclusive sense) so that when used, for example, to connect a list of elements, features, acts, or operations, the term "or" means one, some, or all the elements, features, acts, or operations in the list.

Unless the context clearly indicates otherwise, conjunctive language in the foregoing description and in the appending claims such as the phrase "at least one of X, Y, and Z," is to be understood to convey that an item, term, etc. can be either X, Y, or Z, or a combination thereof. Thus, such conjunctive language does not require that at least one of X, at least one of Y, and at least one of Z to each be present.

Besides those already mentioned above, many modifications and variations of the above examples may be made without departing from the scope of the invention as defined by the appended claims.

What is claimed is:

1. A method comprising:
   receiving, at a transcription service in a provider network, media data comprising audio data that encodes a spoken utterance, the transcription service implemented by one or more electronic devices in the provider network;
   obtaining, at the transcription service, an output of a connectionist temporal classification (CTC) decoder, the output comprising a set of probability values for a sequence of time steps and a set of sub words, the set of sub words comprising a blank sub word, each probability value in the set of probability values for one corresponding time step of the sequence of time steps and one corresponding sub word of the set of sub words;
   beam search decoding, at the transcription service, the output to yield a set of N-best candidate sub word sequences;
   wherein beam search decoding the output comprises boosting a probability of a candidate sub word sequence based on determining that the candidate sub word sequence contains a prefix of a sub word sequence representing a rare or out-of-vocabulary word;
   selecting, at the transcription service, the candidate sub word sequence for inclusion in the set of N-best candidate sub word sequences based on determining the boosted probability; and
   generating, at the transcription service, a text transcription of the spoken utterance based on selecting a 1-best sub word sequence of the set of N-best candidate sub word sequences.

2. The method of claim 1, further comprising:
   receiving, at the transcription service, the media data from a storage service in the provider network, the storage service implemented by one or more electronic devices in the provider network.

3. The method of claim 1, further comprising:
   receiving, at a streaming endpoint of the transcription service, the media data from a user device; and
   sending, from the streaming endpoint, the text transcription to the user device.

4. A method comprising:
   receiving media data comprising audio data that encodes a spoken utterance;
   obtaining an output of a connectionist temporal classification (CTC) decoder, the output comprising a set of probability values for a sequence of time steps and a set of sub words, the set of sub words comprising a blank sub word, each probability value in the set of probability values for one corresponding time step of the sequence of time steps and one corresponding sub word of the set of sub words;
   beam search decoding the output to yield a set of best candidate sub word sequences;
   wherein beam search decoding the output comprises boosting a probability of a candidate sub word sequence based on determining that the candidate sub word sequence contains a prefix of a sub word sequence representing a rare or out-of-vocabulary word;
   selecting the candidate sub word sequence for inclusion in the set of best candidate sub word sequences based on determining the boosted probability; and
   generating a text transcription of the spoken utterance based on selecting a 1-best sub word sequence of the set of best candidate sub word sequences.

5. The method of claim 4, wherein beam search decoding the output comprises:
   determining a boost amount based on determining a difference between (a) the probability of the particular candidate sub word sequence and (b) a probability of a best candidate sub word sequence.

6. The method of claim 5, wherein beam search decoding the output comprises:
   determining a boosting scale based on determining the difference between (a) the probability of the particular candidate sub word sequence and (b) the probability of the best candidate sub word sequence for the sub sequence of time steps; and determining the boost amount as a product of:
  the boosting scale, and
  the difference between (a) the probability of the particular candidate sub word sequence and (b) the probability of the best candidate sub word sequence.

7. The method of claim 4, further comprising:
converting the set of best candidate sub word sequences into a corresponding set of phone sequences;
using a dynamic time warping algorithm to compute a set of alignment distances, each alignment distance of the set of alignment distances between a respective phone sequence of the set of phone sequences and a phone sequence representing the spoken utterance, the phone sequence generated by a phone alignment network;
reordering the set of best candidate sub word sequences based on determining the set of alignment distances; and
selecting the 1-best sub word sequence from the reordered set of best candidate sub word sequences.

8. The method of claim 4, wherein:
generating the text transcription of the spoken utterance based on selecting the 1-best sub word sequence comprises: tokenizing the 1-best sub word sequence into a set of words; and replacing a particular word in the set of words with a custom word from a custom vocabulary based on determining that (a) a pronunciation of the particular word according to corresponding phone predictions derived from the audio data matches (b) a lexicon-derived pronunciation of the custom word; and
the text transcription contains the custom word in place of the particular word.

9. The method of claim 4, wherein:
the method further comprises determining a set of one or more words that are phonetically similar to the rare or out-of-vocabulary word; and
generating the text transcription of the spoken utterance based on selecting the 1-best sub word sequence comprises: recovering a word sequence from the 1-best sub word sequence; and replacing a particular word in the word sequence with the rare or out-of-vocabulary word based on determining that the particular word is in the set of one or more words that are phonetically similar to the rare or out-of-vocabulary word.

10. The method of claim 4, further comprising:
receiving, at a transcription service in a provider network, the media data from a storage service in the provider network, the transcription service implemented by a first one or more electronic devices in the provider network, the storage service implemented by a second one or more electronic devices in the provider network.

11. The method of claim 4, further comprising:
receiving, at a streaming endpoint of a transcription service in a provider network, the media data from a user device, the transcription service implemented by a first one or more electronic devices in the provider network; and
sending, from the streaming endpoint, the text transcription to the user device.

12. The method of claim 4, further comprising:
a shared conformer encoder generating an acoustic embedding representation of the spoken utterance; and
the connectionist temporal classification (CTC) decoder generating the output based on determining the acoustic embedding representation.

13. The method of claim 4, further comprising:
receiving, from a user device, a custom vocabulary comprising the rare or out-of-vocabulary word.

14. The method of claim 4, wherein the method is performed by an edge electronic device.

15. A system comprising:
one or more electronic devices to implement a transcription service in a provider network, the transcription service comprising instructions which when executed cause the transcription service to:
receive media data comprising audio data that encodes a spoken utterance;
obtain an output of a connectionist temporal classification (CTC) decoder, the output comprising a set of probability values for a sequence of time steps and a set of sub words, the set of sub words comprising a blank sub word, each probability value in the set of probability values for one corresponding time step of the sequence of time steps and one corresponding sub word of the set of sub words;
beam search decode the output to yield a set of best candidate sub word sequences;
wherein the instructions to beam search decode the output comprise instructions which when executed cause the transcription service to: boost a probability of a candidate sub word sequence based on determining that the candidate sub word sequence contains a prefix of a sub word sequence representing a rare or out-of-vocabulary word;
select the candidate sub word sequence for inclusion in the set of best candidate sub word sequences based on determining the boosted probability; and
generate a text transcription of the spoken utterance based on selecting a 1-best sub word sequence of the set of best candidate sub word sequences.

16. The system of claim 15, wherein the instructions to beam search decode the output comprise instructions which when executed cause the transcription service to:
determine a boost amount based on determining a difference between (a) the probability of the particular candidate sub word sequence and (b) a probability of a best candidate sub word sequence.

17. The system of claim 16, wherein the instructions to beam search decode the output comprise instructions which when executed cause the transcription service to:
determine a boosting scale based on determining the difference between (a) the probability of the particular candidate sub word sequence and (b) the probability of the best candidate sub word sequence; and
determine the boost amount as a product of:
  the boosting scale, and
  the difference between (a) the probability of the particular candidate sub word sequence and (b) the probability of the best candidate sub word sequence.

18. The system of claim 15, wherein the instructions when executed further cause the transcription service to:
convert the set of best candidate sub word sequences into a corresponding set of phone sequences;
use a dynamic time warping algorithm to compute a set of alignment distances, each alignment distance of the set of alignment distances between a respective phone sequence of the set of phone sequences and a phone sequence representing the spoken utterance, the phone sequence generated by a phone alignment network;
reorder the set of best candidate sub word sequences based on determining the set of alignment distances; and select the 1-best sub word sequence from the reordered set of best candidate sub word sequences.

19. The system of claim 15, wherein:

the instructions for generating the text transcription of the spoken utterance based on selecting the 1-best sub word sequence comprise instructions which when executed cause the transcription service to: tokenize the 1-best sub word sequence into a set of words; and replace a particular word in the set of words with a custom word from a custom vocabulary based on determining that (a) a pronunciation of the particular word according to corresponding phone predictions derived from the audio data matches (b) a lexicon-derived pronunciation of the custom word; and the text transcription contains the custom word in place of the particular word.

20. The system of claim 15, wherein:

the instructions when executed further cause the transcription service to determine a set of one or more words that are phonetically similar to the rare or out-of-vocabulary word; and the instructions for generating the text transcription of the spoken utterance based on selecting the 1-best sub word sequence comprise instructions which when executed cause the transcription service to: recover a word sequence from the 1-best sub word sequence; and replace a particular word in the word sequence with the rare or out-of-vocabulary word based on the determining that the particular word is in the set of one or more words that are phonetically similar to the rare or out-of-vocabulary word.

* * * * *